United States Patent
Mohri et al.

(10) Patent No.: US 6,946,615 B2
(45) Date of Patent: Sep. 20, 2005

(54) METHOD AND SYSTEM FOR ELECTRIC DISCHARGE MACHINING INSULATING MATERIAL OR HIGH RESISTANCE MATERIAL

(75) Inventors: Naotake Mohri, Tokyo (JP); Yasushi Fukuzawa, Tokyo (JP); Akihiro Goto, Tokyo (JP); Takuji Magara, Aichi (JP)

(73) Assignees: Mitsubishi Denki Kabushiki Kaisha, Tokyo (JP); Naokate Mohri, Tokyo (JP)

( * ) Notice: Subject to any disclaimer, the term of this patent is extended or adjusted under 35 U.S.C. 154(b) by 79 days.

(21) Appl. No.: 10/472,384

(22) PCT Filed: Jan. 24, 2002

(86) PCT No.: PCT/JP02/00511

§ 371 (c)(1),
(2), (4) Date: Sep. 23, 2003

(87) PCT Pub. No.: WO03/061890

PCT Pub. Date: Jul. 31, 2003

(65) Prior Publication Data

US 2005/0098541 A1 May 12, 2005

(51) Int. Cl.$^7$ ................................. B23H 1/02
(52) U.S. Cl. ................ 219/69.13; 219/69.17; 219/69.18
(58) Field of Search .............. 219/69.13, 69.17, 219/69.18; 427/540, 580

(56) References Cited

U.S. PATENT DOCUMENTS 5,434,380 A * 7/1995 Magara et al. ............ 219/69.13
6,501,232 B1 * 12/2002 Goto et al. ................. 315/291

FOREIGN PATENT DOCUMENTS

| JP | 62-218024 A | * | 9/1987 | ............ 219/69.13 |
| JP | 7-136849 A | | 5/1995 | |
| JP | 8-1437 A | | 1/1996 | |
| JP | 8-108318 A | | 4/1996 | |
| JP | 8-229740 A | | 9/1996 | |
| JP | 9-253935 A | | 9/1997 | |
| WO | WO99/58743 A1 | * | 11/1999 | |

* cited by examiner

Primary Examiner—Geoffrey S. Evans
(74) Attorney, Agent, or Firm—Sughrue Mion, PLLC

(57) ABSTRACT

An electric discharge machine for machining a workpiece (2a) made of insulating material or other materials comprises: a first comparison member (17) for comparing voltage (V) between the electrodes of the electrode (1) and the workpiece (2a) with the first reference voltage ($V_1$) which is set at a value close to electric power source voltage ($V_0$) not higher than electric power source voltage ($V_0$); a second comparison member (18) for comparing voltage (V) between the electrodes with the second reference voltage ($V_2$) which is set at a value lower than the first reference voltage ($V_1$); and a control member (19) for setting a short electric discharge pulse width ($T_{P1}$) in the case where voltage (V) between the electrodes is lower than the second reference voltage ($V_2$) according to the result of comparison conducted by the second comparison member (18) at a point of time when a predetermined period of time ($T_0$) has passed from the time when voltage (V) between the electrodes becomes lower than the first reference voltage ($V_1$) according to the result of comparison conducted by the first comparison member (17), and for setting a long electric discharge pulse width ($T_{P2}$) in the case where the voltage between the electrodes is higher than the second reference voltage ($V_2$). This electric discharge machine is capable of stabilizing the machining of the workpiece (2a) made of insulating material or other materials and also capable of enhancing quality of a machined face.

10 Claims, 9 Drawing Sheets

VAPORIZATION OF MACHINING LIQUID
MELTING

GENERATION OF VAPORIZING EXPLOSIVE FORCE

GENERATION OF VAPORIZING EXPLOSIVE FORCE

METHOD AND SYSTEM FOR ELECTRIC DISCHARGE MACHINING INSULATING MATERIAL OR HIGH RESISTANCE MATERIAL

TECHNICAL FIELD

The present invention relates to improvements in an electric discharge machining method and electric discharge machine for machining a workpiece when machining electric power is supplied between the workpiece, which is made of insulating material or high resistance material, and an electrode so that pulse-like electric discharge is generated between the electrodes.

BACKGROUND ART

FIGS. 8A to 8E are schematic illustrations showing a mechanism of electric discharge machining. In the drawing, reference numeral 1 is an electrode, reference numeral 2 is a workpiece, reference numeral 3 is an arc column, reference numeral 4 is a working solution, and reference numeral 5 represents chips produced in the process of electric discharge machining. The workpiece 2 is being machined by electric discharge machining through the cycle from the following items (a) to (e) which correspond to FIG. 8A to FIG. 8E. Each item is described as follows. Item (a) is a process in which the arc column 3 is formed by the generation of electric discharge, item (b) is a process in which the workpiece 2 is locally melted and the working solution 4 is vaporized by thermal energy generated by electric discharge, item (c) is a process in which the working solution 4 is vaporized and an explosive force is generated by the vaporization of the working solution 4, item (d) is a process in which a melted portion (chips 5 generated in the process of machining) of the workpiece 2 is scattered, and item (e) is a process in which the workpiece is cooled by the working solution 4 and solidified so that insulation between the electrodes are recovered. When this cycle is repeated highly frequently, the workpiece 2 can be machined.

The above electric discharge machining acquires a firm position as a technique of machining metallic dies and is put into practical use in the fields of automobile industry, electric appliance industry, semiconductor industry and so forth. However, since electric discharge machining is a method of machining in which the phenomenon of electric discharge is utilized as shown by the cycle illustrated in FIGS. 8A to 8E, it is common that electric discharge machining is applied when the workpiece 2 made of conductive material such as material of iron is machined.

Concerning the method of conducting electric discharge machining on the workpiece 2 made of insulating material, there is provided a method disclosed in the official gazette of the Japanese Unexamined Patent Publication No. Sho63-150109. According to the method, a conductive film is coated onto a surface of insulating material by means of flame coating or vapor deposition, and then electric discharge is conducted on insulating material in a working solution containing carbon. For the object of abolishing a specific processing device for applying the above conductive film onto the surface of insulating material, the Japanese Unexamined Patent Publication Nos. Hei7-136849 and Hei9-253935 disclose a technique in which a workpiece made of insulating material or high resistance material is made to directly come into contact with conductive material and subjected to electric discharge machining in a working solution containing carbon.

FIG. 9 is a schematic illustration showing a composition of a wire electric discharge machine disclosed in the Japanese Unexamined Patent Publication No. Hei9-253935. In the drawing, reference numeral 1a is a wire electrode, reference numeral 2a is a workpiece made of insulating material or high resistance material, reference numeral 4a is a working solution containing carbon, reference numeral 6 is a table on which the workpiece 2a is put, reference numeral 7 is a fixing jig, reference numerals 8a, 8b are working solution nozzles, reference numerals 9a, 9b are wire guides, reference numeral 10 is a feeder piece, reference numeral 11 is a working solution supplying pump which is a member for supplying a working solution, reference numeral 12 is conductive material, and reference numeral 13 is a machining electric power supplying member. The workpiece 2a and conductive material 12 are fixed being joined to each other by the fixing jig 7. The wire electrode 1a is positioned at a joining portion of the workpiece 2a and the conductive material 12 by a positioning member not shown in the drawing. When machining electric power is supplied between the wire electrode 1a and the workpiece 2a and also between the wire electrode 1a and conductive material 12 by the machining electric power supply member 13, first, electric discharge is generated only in a portion of the conductive material 12, and then machining is conducted by thermal energy and a component of the electrode is transferred to the workpiece in a portion of the workpiece 2a closest to the conductive material 12. After that, electric discharge is also generated in the transferred portion of the workpiece 2a. In this way, machining of the workpiece 2a proceeds by a shock of electric discharge and thermal energy generated by electric discharge. According to the progress of electric discharge machining, the component of the electrode is transferred onto the surface of the workpiece 2a to be machined, and the working solution 4a is thermally decomposed. Therefore, carbon contained in the working solution 4a attaches to the workpiece 2a in the form of crystalline carbon, the electric resistance of which is relatively low, so that a conductive film can be formed. Electric discharge is generated on the conductive film formed in this way, and the workpiece 2a is machined.

As described above, the principle of the conventional electric discharge machining technique in which a workpiece made of insulating material or high resistance material is machined by electric discharge is that the workpiece is machined through a conductive film formed on the workpiece.

However, when the above conventional electric discharge machining technique is adopted, machining can not be stably conducted and further quality of a machined surface is not high. For the above reasons, the above conventional electric discharge technique has not been put into practical use on a full scale.

DISCLOSURE OF INVENTION

The present invention has been accomplished to solve the above problems. It is an object of the present invention to provide an electric discharge machining method and machine capable of stably machining a workpiece made of insulating material or high resistance material and enhancing quality of a machined surface of the workpiece.

The present invention provides an electric discharge machining method for machining a workpiece when machining electric power is supplied between the workpiece, which is made of insulating material or high resistance material coated with a conductive film, and an electrode, or machining electric power is supplied between the workpiece, which is made of insulating material or high resistance material coming into contact with conductive material, and an electrode so that pulse-like electric discharge is generated between the electrodes in a working solution containing carbon, the electric discharge machining method including the steps of a voltage between the electrodes at a point of time when a predetermined period of time has passed from the start of electric discharge is measured, and a relatively short electric discharge pulse width suitable for machining the workpiece according to the measured value is set and a relatively long electric discharge pulse width suitable for forming a conductive film on a surface of the workpiece to be machined is set.

The present invention also provides an electric discharge machining method for machining a workpiece when machining electric power is supplied between the workpiece, which is made of insulating material or high resistance material coated with a conductive film, and an electrode, or machining electric power is supplied between the workpiece, which is made of insulating material or high resistance material coming into contact with conductive material, and electrode so that pulse-like electric discharge is generated between the electrodes in a working solution containing carbon, the electric discharge machining method including the steps of a voltage between the electrodes at a point of time when a predetermined period of time has passed from the start of electric discharge is measured, and a relatively short electric discharge pulse width suitable for machining the workpiece in the case where the measured value is lower than a predetermined reference voltage is set, and a relatively long electric discharge pulse width suitable for forming a conductive film on a face of the workpiece to be machined in the case where the measured value is higher than a predetermined reference voltage is set.

The present invention also provides an electric discharge machining method for machining a workpiece when machining electric power is supplied between the workpiece, which is made of insulating material or high resistance material coated with a conductive film, and an electrode, or machining electric power is supplied between the workpiece, which is made of insulating material or high resistance material coming into contact with conductive material, and electrode so that pulse-like electric discharge is generated between the electrodes in a working solution containing carbon, the electric discharge machining method including the steps of at least one reference voltage, which is lower than an electric power source voltage, with a voltage between the electrodes is compared, and a relatively short electric discharge pulse width suitable for machining the workpiece according to the result of the comparison is set, and a relatively long electric discharge pulse width suitable for forming a conductive film on a surface of the workpiece to be machined according to the result of the comparison is set.

The present invention also provides an electric discharge machining method for machining a workpiece when machining electric power is supplied between the workpiece, which is made of insulating material or high resistance material coated with a conductive film, and an electrode, or machining electric power is supplied between the workpiece, which is made of insulating material or high resistance material coming into contact with conductive material, and electrode so that pulse-like electric discharge is generated between the electrodes in a working solution containing carbon, the electric discharge machining method including the steps of a voltage between the electrodes at a point of time when a predetermined period of time has passed from the time when the voltage between the electrodes becomes lower than a first reference voltage which is set at a value close to the electric power source voltage lower than the electric power source voltage is measured, and a relatively short electric discharge pulse width suitable for machining the workpiece in the case where the measured value is lower than a predetermined second reference voltage is set, and a relatively long electric discharge pulse width suitable for forming a conductive film on a face of the workpiece to be machined in the case where the measured value is higher than a predetermined second reference voltage is set.

The present invention also provides an electric discharge machine for machining a workpiece by generating pulse-like electric discharge between an electrodes including a machining electric power supply member for supplying machining electric power between a workpiece made of insulating material or high resistance material which are coated with a conductive film, and an electrode, or a machining electric power supply member for supplying machining electric power between the workpiece made of insulating material or high resistance material which are coming into contact with conductive material, and an electrode, a machining liquid supply member for supplying a machining liquid containing carbon between the electrodes, a positioning member for relatively positioning the workpiece and the electrode, a voltage measuring member for measuring voltage between the electrodes at a point of time when a predetermined period of time has passed from the start of electric discharge, and a control member for setting a relatively short electric discharge pulse width suitable for machining the workpiece according to the measured value of voltage between the electrodes measured by the voltage measuring member for measuring voltage between the electrodes and for setting a relatively long electric discharge pulse-width suitable for forming a conductive film on a surface of the workpiece to be machined.

The present invention also provides an electric discharge machine for machining a workpiece by generating pulse-like electric discharge between an electrodes including a machining electric power supply member for supplying machining electric power between a workpiece made of insulating material or high resistance material which are coated with a conductive film, and an electrode, or a machining electric power supply member for supplying machining electric power between the workpiece made of insulating material or high resistance material which are coming into contact with conductive material, and an electrode, a machining liquid supply member for supplying a machining liquid containing carbon between the electrodes, a positioning member for relatively positioning the workpiece and the electrode, a voltage measuring member for measuring voltage between the electrodes at a point of time when a predetermined period of time has passed from the start of electric discharge, and a control member for setting a relatively short electric discharge pulse width suitable for machining the workpiece in the case where the measured value is lower than a predetermined reference voltage according to the measured value of voltage between the electrodes measured by the voltage measuring member for measuring voltage between the electrodes, and for setting a relatively long electric discharge pulse width suitable for forming a conductive film on a face of the workpiece to be machined in the case where the measured value is higher than a predetermined reference voltage according to the measured value of voltage between the electrodes measured by the voltage measuring member for measuring voltage between the electrodes.

The present invention also provides an electric discharge machine for machining a workpiece by generating pulse-like electric discharge between an electrodes including a machining electric power supply member for supplying machining electric power between a workpiece made of insulating material or high resistance material which are coated with a conductive film, and an electrode, or a machining electric power supply member for supplying machining electric power between the workpiece made of insulating material or high resistance material which are coming into contact with conductive material, and an electrode, a machining liquid supply member for supplying a machining liquid containing carbon between the electrodes, a positioning member for relatively positioning the workpiece and the electrode, a voltage measuring member for measuring voltage between the electrodes, and a control member for setting a relatively short electric discharge pulse width suitable for machining the workpiece in the case where a measured value (second measured value), which is measured by the voltage measuring member for measuring voltage between the electrodes at a point of time when a predetermined period of time has passed from the time when a measured value (first measured value) measured by the voltage measuring member for measuring voltage between the electrodes becomes a value lower than a first reference voltage which is set close to electric power source voltage not higher than the electric power source voltage, is lower than a predetermined second reference voltage, and for setting a relatively long electric discharge pulse width suitable for forming a conductive film on a face of the workpiece in the case where the second measured value is higher than the predetermined reference voltage.

The present invention also provides an electric discharge machine for machining a workpiece by generating pulse-like electric discharge between an electrodes including a machining electric power supply member for supplying machining electric power between a workpiece made of insulating material or high resistance material which are coated with a conductive film, and an electrode, or a machining electric power supply member for supplying machining electric power between the workpiece made of insulating material or high resistance material which are coming into contact with conductive material, and an electrode, a machining liquid supply member for supplying a machining liquid containing carbon between the electrodes, a positioning member for relatively positioning the workpiece and the electrode, at least one comparison member for comparing a reference voltage, which is lower than the electric power source voltage, with the voltage between the electrodes, and a control member for setting a relatively short electric discharge pulse width suitable for machining the workpiece according to the result of the comparison, and for setting a relatively long electric discharge pulse width suitable for forming a conductive film on a face of the workpiece to be machined.

The present invention also provides an electric discharge machine for machining a workpiece by generating pulse-like electric discharge between an electrodes including a machining electric power supply member for supplying machining electric power between a workpiece made of insulating material or high resistance material which are coated with a conductive film, and an electrode, or a machining electric power supply member for supplying machining electric power between the workpiece made of insulating material or high resistance material which are coming into contact with conductive material, and an electrode, a machining liquid supply member for supplying a machining liquid containing carbon between the electrodes, a positioning member for relatively positioning the workpiece and the electrode, a comparison member for comparing voltage between the electrodes at a point of time when a predetermined period of time has passed from the start of electric discharge with predetermined reference voltage, and a control member for setting a relatively short electric discharge pulse width suitable for machining the workpiece in the case where the voltage between the electrode is lower than the reference voltage according to the result of the comparison conducted by the comparison member and a control member for setting a relatively long electric discharge pulse width suitable for forming a conductive film on a face of the workpiece in the case where the voltage between the electrode is higher than the reference voltage.

The present invention also provides an electric discharge machine for machining a workpiece by generating pulse-like electric discharge between an electrodes including a machining electric power supply member for supplying machining electric power between a workpiece made of insulating material or high resistance material which are coated with a conductive film, and an electrode, or a machining electric power supply member for supplying machining electric power between the workpiece made of insulating material or high resistance material which are coming into contact with conductive material, and an electrode, a machining liquid supply member for supplying a machining liquid containing carbon between the electrodes, a positioning member for relatively positioning the workpiece and the electrode, a first comparison member for comparing voltage between the electrodes with a first reference voltage which is set at a value close to the electric power source voltage not higher than the electric power source voltage, a second comparison member for comparing voltage between the electrodes with a second reference voltage which is set at a value lower than the first reference voltage, and a control member for setting a relatively short electric discharge pulse width suitable for machining the workpiece in the case where the voltage between the electrodes is lower than the second reference voltage according to the result of the comparison conducted by the second comparison member at a point of time when a predetermined period of time has passed from the time at which the voltage between the electrodes becomes lower than the first reference voltage according to the result of the comparison conducted by the first comparison member, and for setting a relatively long electric discharge pulse width suitable for forming a conductive film on a machined face of the workpiece in the case where the voltage between the electrodes is higher than the second reference voltage.

The electric discharge machining method and electric discharge machine of the present invention is composed as described above. Therefore, it is possible to realize stabilization of machining a workpiece made of insulating material or high resistance material and enhancement of quality of a machine face.

BEST MODE FOR CARRYING OUT THE INVENTION

Embodiment 1

Figure 1:
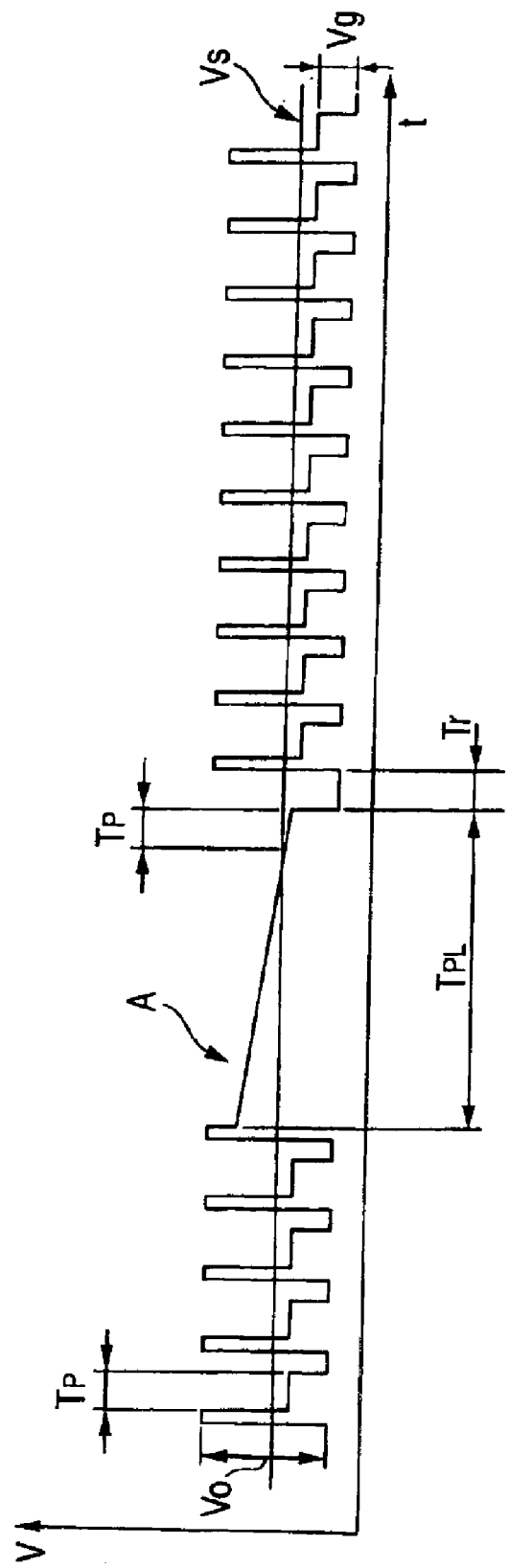
FIG. 1 is a schematic illustration showing an example of a wave-form of voltage impressed between electrodes of a conventional electric discharge machine by which a workpiece made of insulating material or high resistance material is machined.

FIG. 1 is a schematic illustration showing an example of a wave-form of voltage impressed between electrodes of a conventional electric discharge machine by which a workpiece made of insulating material or high resistance material is machined. In the drawing, reference mark t is time, reference mark V is voltage impressed between electrodes, reference mark $V_0$ is electric power source voltage, reference mark Vg is arc voltage, reference mark Vs is electric discharge detection voltage, reference mark $T_P$ is a predetermined electric discharge pulse width, reference mark $T_{PL}$ is an electric discharge pulse width longer than electric discharge pulse width $T_P$ which appears at a certain frequency, and reference mark Tr is recess time.

In the case where electric discharge machining is conducted by a conventional electric discharge machine, by which a workpiece made of insulating material or high resistance material is machined, while a constant electric discharge pulse width $T_P$ is set so as to obtain a machined face of uniform surface roughness by keeping electric discharge energy at a constant value, when a state of electric discharge machining is observed, it is possible to observe electric discharge pulse width $T_{PL}$ which is longer than electric discharge pulse width $T_P$ as shown in FIG. 1. The above wave-form of voltage impressed between electrodes will be studied as follows.

A commonly used electric discharge machine is planned as follows. In order to make an electric discharge pulse width to be a predetermined electric discharge pulse width $T_P$, a predetermined voltage not higher than electric power source voltage $V_0$ is used as electric discharge detection voltage $V_S$, and at a point of time when voltage becomes lower than electric discharge detection voltage $V_S$, it is recognized that electric discharge has started, and the measurement of electric discharge pulse width $T_P$ is started. However, in the case of electric discharge machining of a workpiece made of insulating material or high resistance material, since electric resistance on a surface of the workpiece is high, voltage between electrodes impressed after the start of electric discharge becomes high. In this case, the voltage between electrodes includes a drop in voltage caused by electric resistance of the workpiece. Therefore, as shown by A in FIG. 1, voltage V between electrodes is not lower than electric discharge detection voltage $V_S$ although electric discharge is started. Therefore, the electric discharge machine does not recognize that electric discharge has started. Accordingly, the electric discharge machine keeps on impressing voltage. In this case, voltage between electrodes is gradually lowered. After a period of time corresponding to a predetermined electric discharge pulse width $T_P$ (for example, several 10 $\mu$s) has passed from a point of time when voltage V between electrodes gradually decreases and becomes lower than electric discharge detection voltage $V_S$, the impression of voltage is stopped and the process comes to rest for recess time Tr. As described above, a phenomenon is caused in which an actual pulse width becomes $T_{PL}$ that is several times or several tens times as long as the above predetermined electric discharge pulse width $T_P$.

The phenomenon itself can be said to be a phenomenon of malfunction caused in the case where a workpiece made of insulating material or high resistance material is machined by an electric discharge machine which is manufactured in order to machine a workpiece made of conductive material such as steel. However, the above phenomenon fulfills an important function when a workpiece made of insulating material or high resistance material is machined by electric discharge machining. That is, when an electric discharge pulse, the pulse width of which is much longer than the pulse width of the setting, appears according to the above phenomenon, it becomes possible to machine insulating material or high resistance material. As shown in the description of the background art, when a workpiece made of insulating material or high resistance material is machined by electric discharge machining, it is necessary to conduct machining while a conductive film is being formed on a surface of the workpiece. According to the investigation made by the present inventors, the following facts have been made clear. An electric discharge pulse, the pulse width of which is short and the same as the setting value (This pulse is referred to as "a short electric discharge pulse" hereinafter.), contributes to removing a conductive film and machining the workpiece. An electric discharge pulse, the pulse width of which is long and exceeds the setting value (This pulse is referred to as "a long electric discharge pulse" hereinafter.), contributes to forming a conductive film on a surface of the workpiece.

In general, it is well known that when an electric discharge pulse width is extended in electric discharge machining in which oil is used as a working solution, carbon produced by decomposition of the working solution attaches to one of the electrodes. However, in the case of electric discharge machining conducted on a workpiece made of insulating material or high resistance material, the above phenomenon is meaningful for performing the electric discharge machining. The detail of this fact will be described as follows. When a long electric discharge pulse appears, a working solution is decomposed by heat generated in the process of electric discharge machining. Therefore, crystalline carbon, the electric resistance of which is relatively low, is produced from carbon contained in the working solution, and an electric discharge face of the workpiece is covered with this crystalline carbon. Due to the foregoing, the surface of the workpiece can be electrified, so that electric discharge can be continuously generated between the surface of the workpiece and the electrode which is a tool. The short electric discharge pulse conducts machining on the workpiece in the same manner as that of the pulse of usual electric discharge machining, however, since electric discharge is generated with respect to a conductive film on the surface of the workpiece produced as described above, it is estimated that the workpiece is melted or sublimed by the influence of the thus generated heat while the conductive film is being removed.

As described above, in the conventional electric discharge machine by which a workpiece made of insulating material or others is machined, a long electric discharge pulse, which is meaningful for conducting electric discharge on insulating material or others, is generated by a phenomenon which may be called a malfunction. Due to the foregoing, the width of a long electric discharge pulse fluctuates, and thickness of a conductive film formed on an electric discharge face of the workpiece fluctuates. As a result, electric discharge machining becomes unstable and further quality of the machined face is deteriorated.

Figure 2:
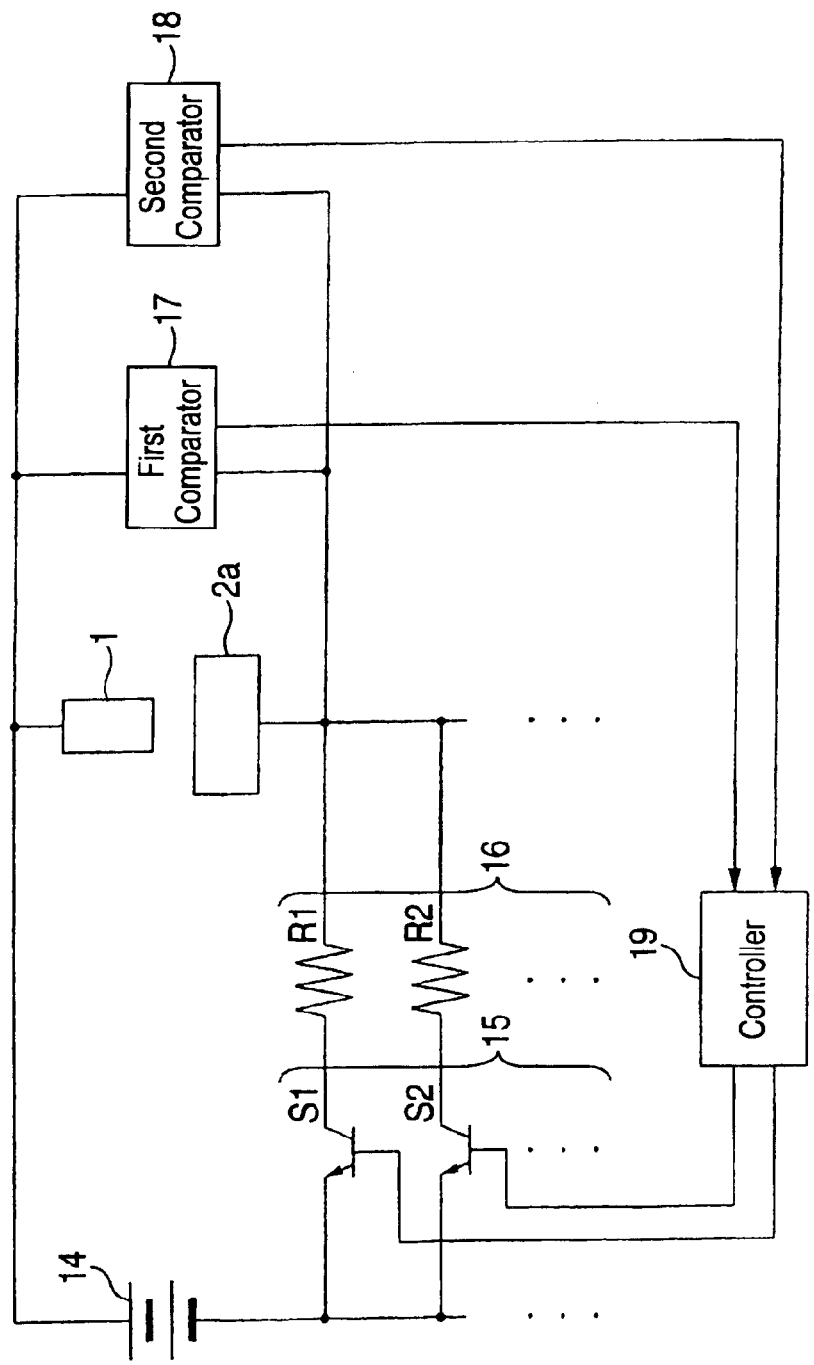
FIG. 2 is a schematic illustration showing a composition of an electric discharge machine of Embodiment 1 of the present invention.

FIG. 2 is a schematic illustration showing a composition of an electric discharge machine of Embodiment 1 of the present invention. In the drawing, reference numeral 1 is an electrode, reference numeral 2a is a workpiece made of insulating material or high resistance material, for example, reference numeral 2a is a workpiece made of insulating ceramics, reference numeral 14 is a DC electric power source, reference numeral 15 is a switching element, reference numeral 16 is a resistor, reference numeral 17 is a first comparator which is a comparison member for comparing voltage between electrodes with predetermined reference voltage, reference numeral 18 is a second comparator which is a comparison member for comparing voltage between electrodes with predetermined reference voltage, and reference numeral 19 is a control member. The same portions as those of a conventional electric discharge machine such as a positioning member for relatively positioning the electrode 1 and the workpiece 2a are omitted here. In this case, the workpiece 2a is coated with a conductive film in the same manner as that described in the Japanese Unexamined Patent Publication No. Sho63-150109. Alternatively, the workpiece 2a is contacted with and fixed to conductive material in the same manner as that described in the Japanese Unexamined Patent Publication Nos. Hei7-136849 and Hei9-253935.

Figure 3:
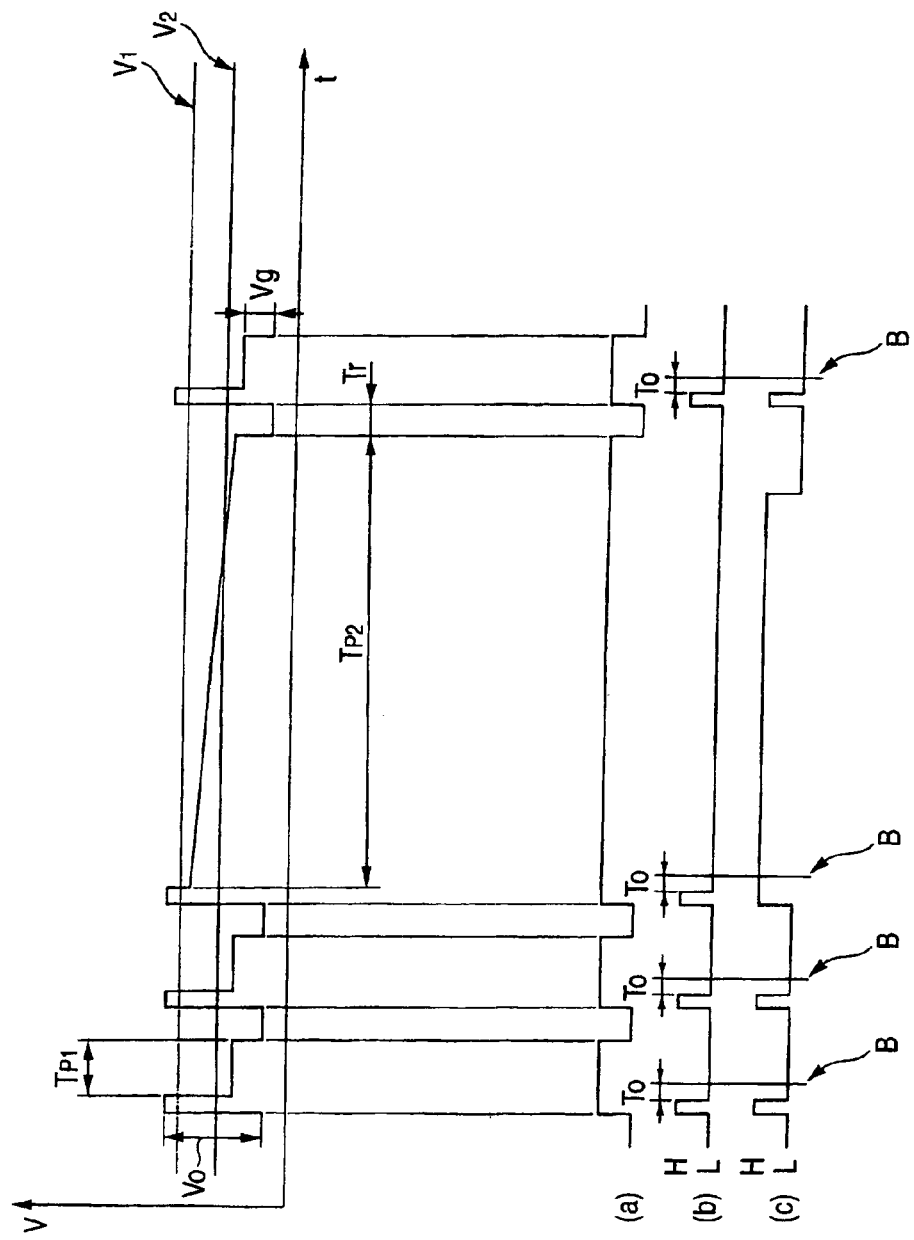
FIG. 3 is a schematic illustration showing an example of a wave-form of voltage impressed between electrodes of an electric discharge machine of Embodiment 1 of the present invention.

FIG. 3 is a schematic illustration showing an example of a wave-form of voltage impressed between electrodes of an electric discharge machine of Embodiment 1 of the present invention. Like reference characters are used to indicate like parts in FIGS. 1 and 3. In FIG. 3, signal (a) sent from the control member 19 for driving the switching element 15 shown in FIG. 2, output signal (b) of the first comparator 17 and output signal (c) of the second comparator 18 are shown being synchronized with a wave-form of voltage between the electrodes.

In FIG. 3, reference mark $T_{P1}$ is a relatively short electric discharge pulse width suitable for machining the workpiece 2a, reference mark $T_{P2}$ is a relatively long electric discharge pulse width suitable for forming a conductive film on a face of the workpiece 2a to be machined, reference mark $T_0$ is a predetermined period of time from the start of electric discharge, reference mark $V_1$ is reference voltage of the first comparator 17, and reference mark $V_2$ is reference voltage of the second comparator 18. Reference voltage $V_1$ of the first comparator 17 is set at a value close to electric power source voltage $V_0$, and reference voltage $V_2$ of the second comparator 18 is set at a value lower than reference voltage $V_1$. Both reference voltage $V_1$ and reference voltage $V_2$ are set at values higher than arc voltage Vg. The first comparator 17 compares voltage V between the electrodes with reference voltage $V_1$, and when reference voltage $V_1$ is lower than voltage V between the electrodes, the first comparator 17 outputs signal H, and when reference voltage $V_1$ is higher than voltage V between the electrodes, the first comparator 17 outputs signal L. In the same manner, the second comparator 18 compares voltage V between the electrodes with reference voltage $V_2$, and when reference voltage $V_2$ is lower than voltage V between the electrodes, the second comparator 18 outputs signal H, and when reference voltage $V_2$ is higher than voltage V between the electrodes, the second comparator 18 outputs signal L. A point of time when the output signal (b) of the first comparator 17 changes from H to L is judged to be a start of electric discharge.

In the case where electric resistance of the surface of the workpiece 2a, which is made of insulating material or high resistance material, is low, like the short electric discharge pulse width $T_{P1}$ shown in FIG. 3, voltage V between the electrodes sharply drops after the start of electric discharge and becomes lower than reference voltage $V_1$ of the first comparator 17 and reference voltage $V_2$ of the second comparator 18. On the other hand, in the case where electric resistance of the surface of the workpiece 2a is high, like the long electric discharge pulse width $T_{P2}$ shown in FIG. 3, voltage V between the electrodes does not sharply drop after the start of electric discharge, but voltage V between the electrodes becomes lower than reference voltage $V_1$ of the first comparator 17, however, voltage V between the electrodes becomes higher than reference voltage $V_2$ of the second comparator 18.

At a point of time when predetermined period of time $T_0$ has passed from the start of electric discharge (at the time B shown in FIG. 3), the electric discharge pulse width is set by the control member 19 according to the output signals of the first comparator 17 and the second comparator 18. That is, in the case where electric resistance of the surface of the workpiece 2a is relatively low at a point of time when a predetermined period of time $T_0$ has passed from the start of electric discharge, a short pulse width $T_{P1}$ is set by the control member 19. In the case where electric resistance of the surface of the workpiece 2a is relatively high at a point of time when a predetermined period of time $T_0$ has passed from the start of electric discharge, a long pulse width $T_{P2}$ is set by the control member 19. The reason why the short pulse width $T_{P1}$ or long pulse width $T_{P2}$ is set will be explained below.

As described above, an electric discharge pulse, the pulse width of which is short (The pulse width is $T_{P1}$.), contributes to removing a conductive film and machining the workpiece 2a. An electric discharge pulse, the pulse width of which is long (The pulse is $T_{P2}$.), contributes to forming a conductive film on a surface of the workpiece 2a. According to the investigations made by the present inventors, the following facts have been made clear. In the case where a conductive film is tightly formed at the electric discharge starting position of the workpiece 2a, a drop in voltage is big, that is, voltage between the electrodes is low, and in the case where a small quantity of conductive film is left at the electric discharge starting position of the workpiece 2a, a drop in voltage is small, that is, voltage between the electrodes is high.

Figure 4A:
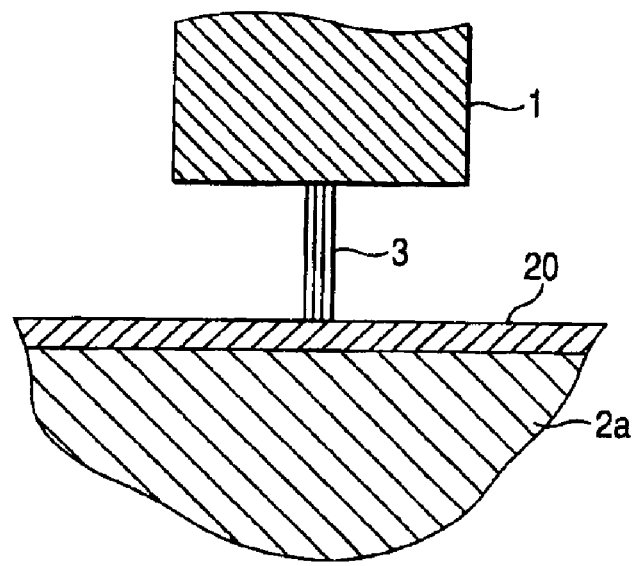
FIGS. 4A and 4B are schematic illustrations showing a phenomenon of electric discharge generated in the process of machining a workpiece made of insulating material or high resistance material.
Figure 4B:
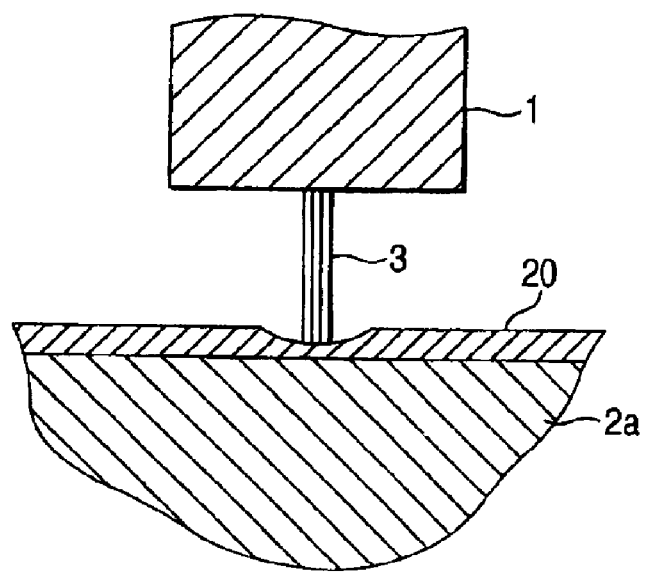
Figure 5A:
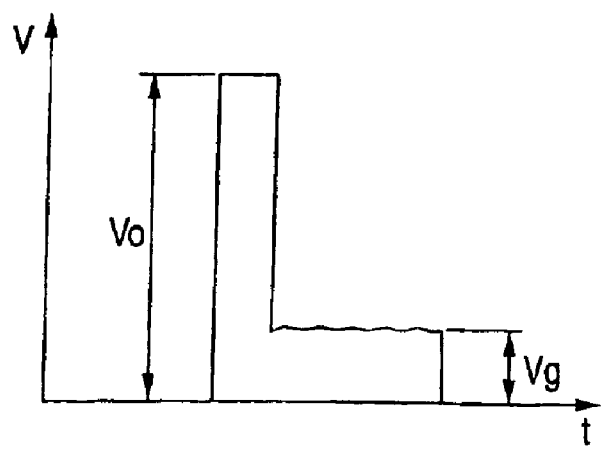
FIGS. 5A and 5B are schematic illustrations showing a wave-form of voltage impressed between electrodes corresponding to FIGS. 4A and 4B.
Figure 5B:
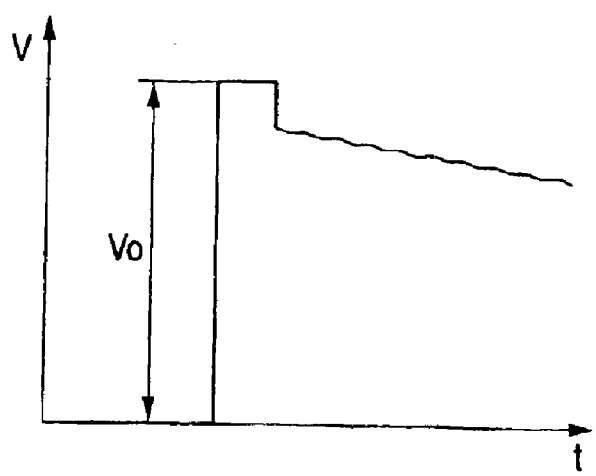

FIGS. 4A and 4B are schematic illustrations showing a phenomenon of electric discharge generated in the process of machining a workpiece made of insulating material or high resistance material. In the drawing, reference numeral 1 is an electrode, reference numeral 2a is a workpiece made of insulating material or high resistance material, reference numeral 3 is an arc column, and reference numeral 20 is a conductive film. FIG. 4A is a view showing a case in which a phenomenon of electric discharge has occurred in a portion of the conductive film 20 formed on the workpiece 2a where the electric resistance is low, and FIG. 4B is a view showing a case in which a phenomenon of electric discharge has occurred in a portion of the conductive film 20 formed on the workpiece 2a where the electric resistance is high. FIGS. 5A and 5B are schematic illustrations showing a wave-form of voltage impressed between electrodes corresponding to FIGS. 4A and 4B. In the drawing, t is time, V is voltage impressed between the electrodes, $V_0$ is the electric power source voltage, and Vg is arc voltage. FIG. 5A is a view showing a wave-form of voltage impressed between the electrodes corresponding to FIG. 4A, and FIG. 5B is a view showing a wave-form of voltage impressed between the electrodes corresponding to FIG. 4B.

In the case where voltage V between the electrodes and reference voltage are compared with each other by the comparator shown in FIG. 2, voltage of the electrode 1 and voltage on the workpiece 2a side are compared with each other through the conductive film 20 as shown in FIGS. 4A and 4B. In the case where the conductive film 20 is tightly formed and electric resistance is relatively low as shown in FIG. 4A, the measurement of voltage is substantially equivalent to a measurement in which an electric potential difference of the arc column 3 is directly measured. Therefore, voltage V between the electrode becomes equivalent to arc voltage Vg, which is about 20V to 30V as shown in FIG. 5A. On the other hand, in the case where a quantity of conductive film 20 is small and electric resistance is high as shown in FIG. 4B, in addition to the electric potential difference of the arc column 3, a drop in voltage caused in a portion close to the electric discharge point, the electric resistance of which is high, is detected as voltage V between the electrodes. Therefore, a detected value of voltage V between the electrodes is increased as shown in FIG. 5B.

As explained above, electric resistance at the position where electric discharge has started can be judged by the voltage immediately after the start of electric discharge, that is, a state of the conductive film 20 can be judged by the voltage immediately after the start of electric discharge.

Figure 6:
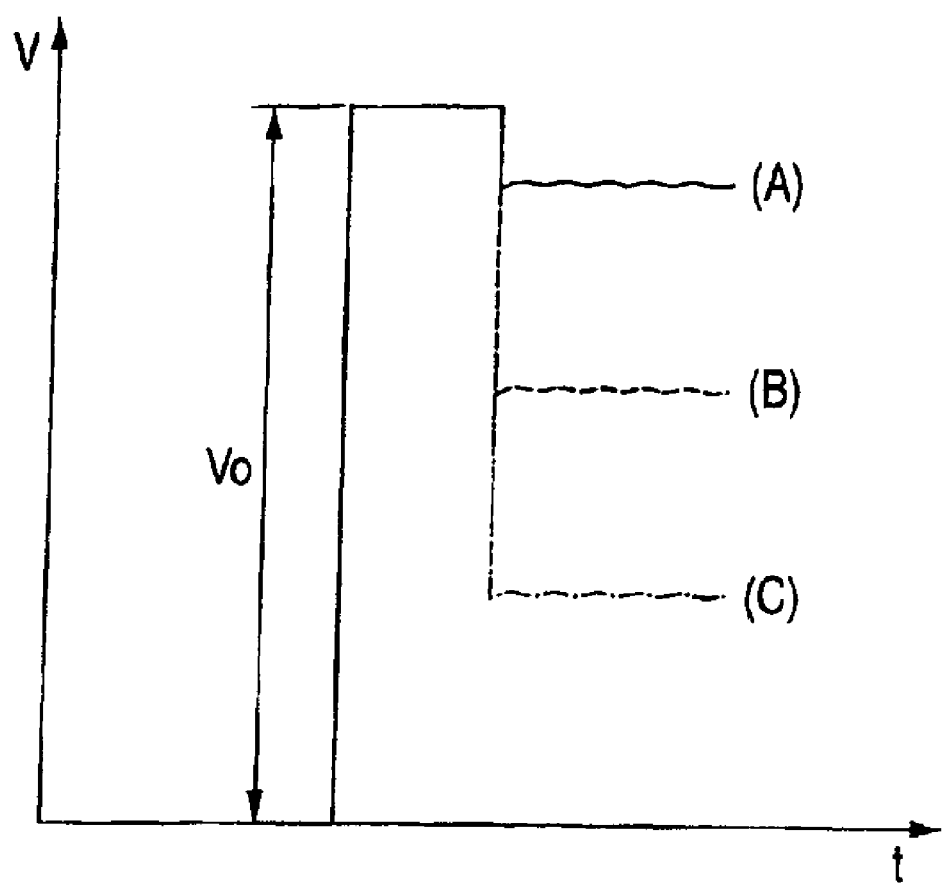
FIG. 6 is a schematic illustration showing an example of a change in a wave-form of voltage impressed between electrodes, wherein the change in the wave-form of voltage is caused by a state of a conductive film.

FIG. 6 is a schematic illustration showing an example of a change in a wave-form of voltage impressed between electrodes, wherein the change in the wave-form of voltage is caused by a state of a conductive film 20. In the drawing, t is time, V is voltage between the electrodes, and $V_0$ is voltage of the electric power source. In FIG. 6, the following can be understood. According to the intensity of voltage V between the electrodes immediately after the start of electric discharge, for example, according to (A), (B) and (C) shown in the drawing, electric resistance of (A) at the position of start of electric discharge is the highest, and electric resistance of (B) is next to electric resistance of (A), and electric resistance of (C) is next to electric resistance of (B). Concerning the thickness of the conductive film 20 at the position of start of electric discharge, (C) is the largest, and (B) is next to (A), and (C) is next to (B).

An appropriate pulse width of electric discharge, which corresponds to a case in which the thickness of the conductive film 20 is reduced as shown in FIG. 4B, may be previously found by an experiment.

For example, a state of the conductive film 20 at the point of electric discharge is judged with the comparator shown in FIG. 2 as follows. In the case where the thickness of the conductive film 20 is small, that is, in the case where voltage V between the electrodes at the point of time when predetermined period of time $T_0$ has passed from the start of electric discharge is high, appropriate long pulse width $T_{P2}$ of electric discharge is previously found by an experiment, and a state of the conductive film 20 at the point of electric discharge is judged from voltage V between the electrodes at the point of time when predetermined period of time $T_0$ has passed from the start of electric discharge. In the case where voltage V between the electrodes at the point of time when predetermined period of time $T_0$ has passed from the start of electric discharge is low, that is, in the case where the thickness of the conductive film 20 is large, short pulse width $T_{P1}$ of electric discharge is set. In the case where voltage V between the electrodes at the point of time when predetermined period of time $T_0$ has passed from the start of electric discharge is high that is, in the case where the thickness of the conductive film 20 is small, long pulse width $T_{P2}$ of electric discharge is set. In this way, electric discharge can be made to proceed, and an electric conductive film can be formed at a position of electric discharge where the thickness of the conductive film is reduced, and an appropriate pulse width can be set according to the state of the conductive film 20.

Accordingly, it is possible to solve the problems caused in the conventional electric discharge machine by which a workpiece made of insulating material is machined, that is, it is possible to solve the problems that the pulse width of a long electric discharge pulse is not stabilized and the thickness of a conductive film formed on the electric discharge face of the workpiece fluctuates. As a result, the workpiece made of insulating material or high resistance material can be stably machined, and quality of the machined face can be enhanced.

For example, in the case of electric discharge conducted by a diesinking electric discharge machine of the prior art, surface roughness on a machined face of a workpiece is approximately 10 μm, however, according to electric discharge machining conducted by a diesinking electric discharge machine of the present invention, surface roughness on a machined face of a workpiece can be improved to about 3 μm.

In the above explanation, for example, as shown in FIG. 2, the two comparators are provided, the start of electric discharge is judged by an output signal of the first comparator 17, electric resistance on the surface of the workpiece is judged by an output signal of the second comparator 18, and two types of the electric discharge pulse width are set according to the electric resistance. However, the number of the comparators may be increased, that is, three or more types of the electric discharge pulse width may be set. In the case where three or more types of electric discharge pulse width are set according to electric resistance between the electrodes, it becomes possible to more precisely set the electric discharge pulse width according to a state of the conductive film attached to the workpiece. Therefore, the workpiece made of insulating material or high resistance material can be more stably conducted, and quality of the machined face can be enhanced.

In this connection, the electric discharge machining method and electric discharge machine of the present invention can be applied to wire electric discharge machining, diesinking electric discharge machining and small hole machining.

As explained above, according to the electric discharge machining method and electric discharge machine of the present invention, in the electric discharge machining of a workpiece made of insulating material or high resistance material, a state of the surface of the workpiece is judged from voltage between the electrodes which changes by electric resistance on the surface of the workpiece, and the width of a long electric discharge pulse for forming a thick conductive film out of a thin conductive film on the workpiece is appropriately set according to the result of the judgment. Therefore, the present invention is different from the invention disclosed in the Japanese Unexamined Patent Publication No. Hei3-3722 in which the pulse width of electric discharge is adjusted in order to conduct machining while electric discharge energy is being kept constant according to a detected value of voltage impressed between the electrodes.

Embodiment 2

Figure 7:
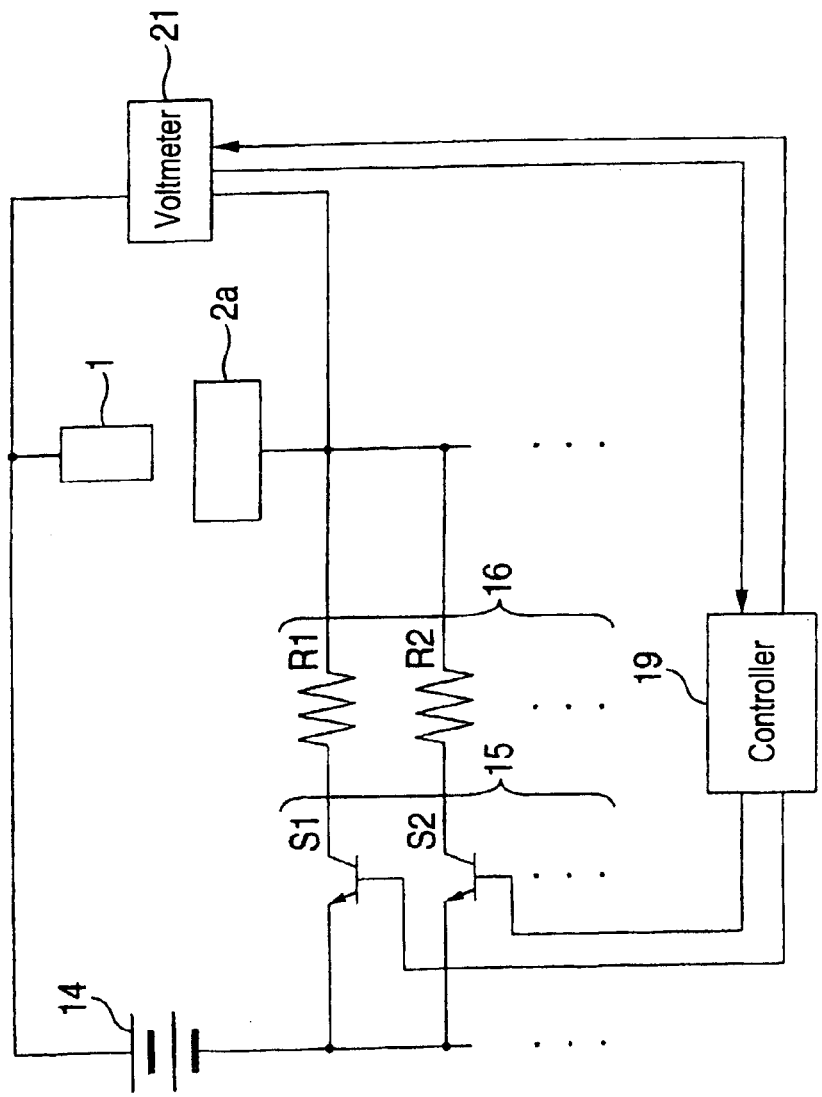
FIG. 7 is a schematic illustration showing a composition of an electric discharge machine of Embodiment 2 of the present invention.
Figure 8A:
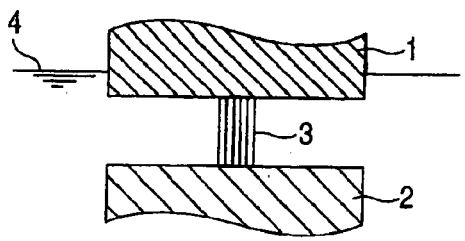
FIGS. 8A to 8E are schematic illustrations showing a mechanism of electric discharge machining.
Figure 8B:
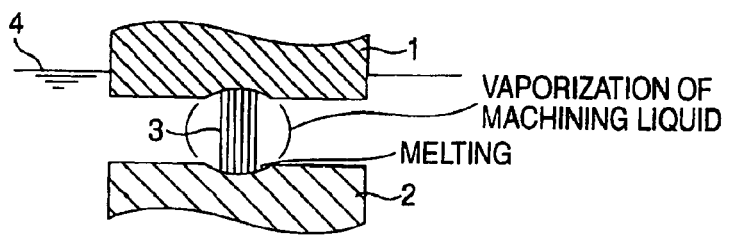
Figure 8C:
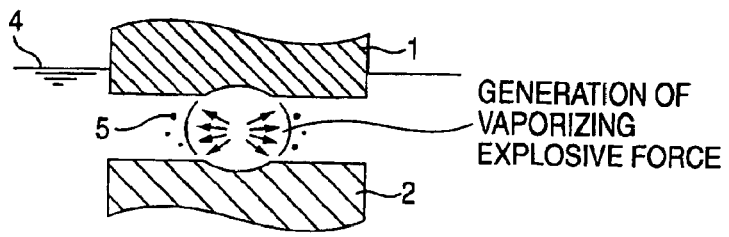
Figure 8D:
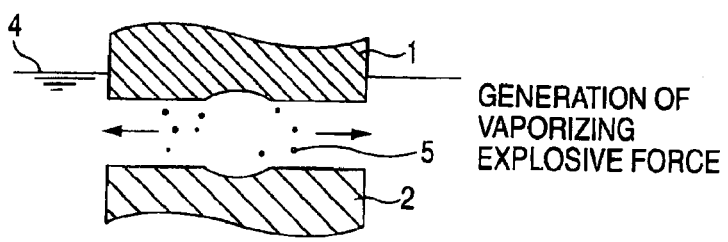
Figure 8E:
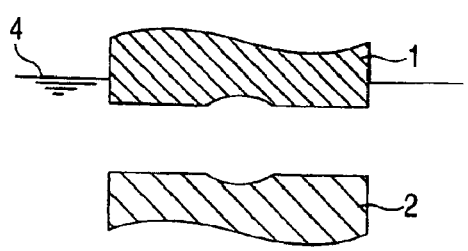
Figure 9:
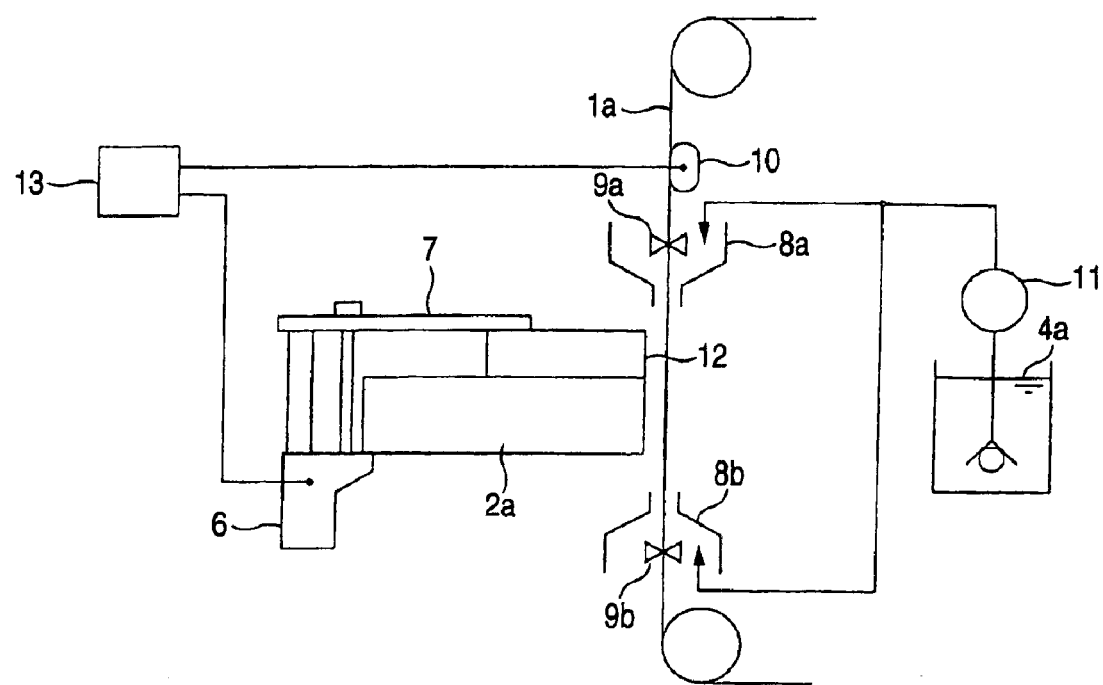
FIG. 9 is a schematic illustration showing a composition of a conventional wire electric discharge machine by which a workpiece made of insulating material or high resistance material is machined.

FIG. 7 is a schematic illustration showing a composition of an electric discharge machine of Embodiment 2 of the present invention. Like reference characters are used to indicate like parts in FIG. 2 showing Embodiment 1 and FIG. 7 showing Embodiment 2. In FIG. 7, reference numeral 21 is a voltmeter which is a measurement member for measuring voltage impressed between the electrodes, and the thus measured value is sent to the control member 19. In the case where voltage between the electrodes measured by the voltmeter 21 becomes a value not higher than the first reference voltage, which is voltage that has been set at a value close to the electric power source voltage not higher than the electric power source voltage, it is judged that electric discharge has started.

At a point of time when a predetermined period of time (for example, a period of time corresponding to $T_0$ shown in FIG. 3) has passed, a signal is sent from the control member 19 to the voltmeter 21. At this time, the voltmeter 21 measures volt impressed between the electrodes. In this case, as shown Embodiment 1, an attaching state of the conductive film can be judged by the electric resistance between the electrodes. Therefore, according to the value of voltage between the electrodes measured by the voltmeter 21, this measured value and the second reference voltage, which is voltage to be set at a value not higher than the first reference voltage and higher than the arc voltage, are compared with each other. In the case where the measured value is lower than the second reference voltage, a relatively short electric discharge pulse width (for example, $T_{P1}$ shown in FIG. 3), which is appropriate for machining the workpiece 2a, is set by the control member 19. In the case where the measured value is higher than the second reference voltage, a relatively long electric discharge pulse width (for example, $T_{P2}$ shown in FIG. 3), which is appropriate for forming a conductive film on the machined face of the workpiece 2a, is set by the control member 19.

When the above composition is adopted, the same effect as that of Embodiment 1 can be provided.

INDUSTRIAL APPLICABILITY

As described above, the electric discharge machining method and electric discharge machine of the present invention is appropriately used for electric discharge machining of a workpiece made of insulating material or high resistance material.

What is claim is:

1. In an electric discharge machining method for machining a workpiece when machining electric power is supplied between said workpiece, which is made of insulating material or high resistance material coated with a conductive film, and an electrode, or machining electric power is supplied between said workpiece, which is made of insulating material or high resistance material coming into contact with conductive material, and an electrode so that pulse-like electric discharge is generated between said electrodes in a working solution containing carbon, said electric discharge machining method comprising the steps of:
   a voltage between said electrodes at a point of time when a predetermined period of time has passed from the start of electric discharge is measured; and
   a relatively short electric discharge pulse width suitable for machining said workpiece according to the measured value is set and a relatively long electric discharge pulse width suitable for forming a conductive film on a surface of said workpiece to be machined is set.

2. In an electric discharge machining method for machining a workpiece when machining electric power is supplied between said workpiece, which is made of insulating material or high resistance material coated with a conductive film, and an electrode, or machining electric power is supplied between said workpiece, which is made of insulating material or high resistance material coming into contact with conductive material, and electrode so that pulse-like electric discharge is generated between said electrodes in a working solution containing carbon, said electric discharge machining method comprising the steps of:
   a voltage between said electrodes at a point of time when a predetermined period of time has passed from the start of electric discharge is measured; and
   a relatively short electric discharge pulse width suitable for machining said workpiece in the case where the measured value is lower than a predetermined reference voltage is set, and
   a relatively long electric discharge pulse width suitable for forming a conductive film on a face of said workpiece to be machined in the case where the measured value is higher than a predetermined reference voltage is set.

3. In an electric discharge machining method for machining a workpiece when machining electric power is supplied between said workpiece, which is made of insulating material or high resistance material coated with a conductive film, and an electrode, or machining electric power is supplied between said workpiece, which is made of insulating material or high resistance material coming into contact with conductive material, and electrode so that pulse-like electric discharge is generated between said electrodes in a working solution containing carbon, said electric discharge machining method comprising the steps of:
   at least one reference voltage, which is lower than an electric power source voltage, with a voltage between said electrodes is compared; and
   a relatively short electric discharge pulse width suitable for machining said workpiece according to the result of the comparison is set, and a relatively long electric discharge pulse width suitable for forming a conductive film on a surface of said workpiece to be machined according to the result of the comparison is set.

4. In an electric discharge machining method for machining a workpiece when machining electric power is supplied between said workpiece, which is made of insulating material or high resistance material coated with a conductive film, and an electrode, or machining electric power is supplied between said workpiece, which is made of insulating material or high resistance material coming into contact with conductive material, and electrode so that pulse-like electric discharge is generated between said electrodes in a working solution containing carbon, said electric discharge machining method comprising the steps of:

a voltage between said electrodes at a point of time when a predetermined period of time has passed from the time when the voltage between said electrodes becomes lower than a first reference voltage which is set at a value close to the electric power source voltage lower than the electric power source voltage is measured; and a relatively short electric discharge pulse width suitable for machining said workpiece in the case where the measured value is lower than a predetermined second reference voltage is set, and a relatively long electric discharge pulse width suitable for forming a conductive film on a face of said workpiece to be machined in the case where the measured value is higher than a predetermined second reference voltage is set.

5. An electric discharge machine for machining a workpiece by generating pulse-like electric discharge between an electrodes comprising:

a machining electric power supply member for supplying machining electric power between a workpiece made of insulating material or high resistance material which are coated with a conductive film, and an electrode, or a machining electric power supply member for supplying machining electric power between said workpiece made of insulating material or high resistance material which are coming into contact with conductive material, and an electrode;

a machining liquid supply member for supplying a machining liquid containing carbon between said electrodes;

a positioning member for relatively positioning said workpiece and said electrode;

a voltage measuring member for measuring voltage between said electrodes at a point of time when a predetermined period of time has passed from the start of electric discharge; and a control member for setting a relatively short electric discharge pulse width suitable for machining said workpiece according to the measured value of voltage between said electrodes measured by the voltage measuring member for measuring voltage between said electrodes and for setting a relatively long electric discharge pulse width suitable for forming a conductive film on a surface of said workpiece to be machined.

6. An electric discharge machine for machining a workpiece by generating pulse-like electric discharge between an electrodes comprising:

a machining electric power supply member for supplying machining electric power between a workpiece made of insulating material or high resistance material which are coated with a conductive film, and an electrode, or a machining electric power supply member for supplying machining electric power between said workpiece made of insulating material or high resistance material which are coming into contact with conductive material, and an electrode;

a machining liquid supply member for supplying a machining liquid containing carbon between said electrodes;

a positioning member for relatively positioning said workpiece and said electrode;

a voltage measuring member for measuring voltage between said electrodes at a point of time when a predetermined period of time has passed from the start of electric discharge; and a control member for setting a relatively short electric discharge pulse width suitable for machining said workpiece in the case where the measured value is lower than a predetermined reference voltage according to the measured value of voltage between said electrodes measured by the voltage measuring member for measuring voltage between said electrodes, and for setting a relatively long electric discharge pulse width suitable for forming a conductive film on a face of said workpiece to be machined in the case where the measured value is higher than a predetermined reference voltage according to the measured value of voltage between said electrodes measured by the voltage measuring member for measuring voltage between said electrodes.

7. An electric discharge machine for machining a workpiece by generating pulse-like electric discharge between an electrodes comprising:

a machining electric power supply member for supplying machining electric power between a workpiece made of insulating material or high resistance material which are coated with a conductive film, and an electrode, or a machining electric power supply member for supplying machining electric power between said workpiece made of insulating material or high resistance material which are coming into contact with conductive material, and an electrode;

a machining liquid supply member for supplying a machining liquid containing carbon between said electrodes;

a positioning member for relatively positioning said workpiece and said electrode;

a voltage measuring member for measuring voltage between said electrodes; and a control member for setting a relatively short electric discharge pulse width suitable for machining said workpiece in the case where a measured value (second measured value), which is measured by the voltage measuring member for measuring voltage between said electrodes at a point of time when a predetermined period of time has passed from the time when a measured value (first measured value) measured by the voltage measuring member for measuring voltage between said electrodes becomes a value lower than a first reference voltage which is set close to electric power source voltage not higher than the electric power source voltage, is lower than a predetermined second reference voltage, and for setting a relatively long electric discharge pulse width suitable for forming a conductive film on a face of said workpiece in the case where the second measured value is higher than the predetermined reference voltage.

8. An electric discharge machine for machining a workpiece by generating pulse-like electric discharge between an electrodes comprising:

a machining electric power supply member for supplying machining electric power between a workpiece made of insulating material or high resistance material which are coated with a conductive film, and an electrode, or a machining electric power supply member for supplying machining electric power between said workpiece made of insulating material or high resistance material which are coming into contact with conductive material, and an electrode;

a machining liquid supply member for supplying a machining liquid containing carbon between said electrodes;

a positioning member for relatively positioning said workpiece and said electrode;

at least one comparison member for comparing a reference voltage, which is lower than the electric power source voltage, with the voltage between said electrodes; and a control member for setting a relatively short electric discharge pulse width suitable for machining said workpiece according to the result of the comparison, and for setting a relatively long electric discharge pulse width suitable for forming a conductive film on a face of said workpiece to be machined.

9. An electric discharge machine for machining a workpiece by generating pulse-like electric discharge between an electrodes comprising:

a machining electric power supply member for supplying machining electric power between a workpiece made of insulating material or high resistance material which are coated with a conductive film, and an electrode, or a machining electric power supply member for supplying machining electric power between said workpiece made of insulating material or high resistance material which are coming into contact with conductive material, and an electrode;

a machining liquid supply member for supplying a machining liquid containing carbon between said electrodes;

a positioning member for relatively positioning said workpiece and said electrode;

a comparison member for comparing voltage between said electrodes at a point of time when a predetermined period of time has passed from the start of electric discharge with predetermined reference voltage; and a control member for setting a relatively short electric discharge pulse width suitable for machining said workpiece in the case where the voltage between said electrodes is lower than the reference voltage according to the result of the comparison conducted by the comparison member and a control member for setting a relatively long electric discharge pulse width suitable for forming a conductive film on a face of said workpiece in the case where the voltage between said electrodes is higher than the reference voltage.

10. An electric discharge machine for machining a workpiece by generating pulse-like electric discharge between an electrodes comprising:

a machining electric power supply member for supplying machining electric power between a workpiece made of insulating material or high resistance material which are coated with a conductive film, and an electrode, or a machining electric power supply member for supplying machining electric power between said workpiece made of insulating material or high resistance material which are coming into contact with conductive material, and an electrode;

a machining liquid supply member for supplying a machining liquid containing carbon between said electrodes;

a positioning member for relatively positioning said workpiece and said electrode;

a first comparison member for comparing voltage between said electrodes with a first reference voltage which is set at a value close to the electric power source voltage not higher than the electric power source voltage;

a second comparison member for comparing voltage between said electrodes with a second reference voltage which is set at a value lower than the first reference voltage; and a control member for setting a relatively short electric discharge pulse width suitable for machining said workpiece in the case where the voltage between said electrodes is lower than the second reference voltage according to the result of the comparison conducted by the second comparison member at a point of time when a predetermined period of time has passed from the time at which the voltage between said electrodes becomes lower than the first reference voltage according to the result of the comparison conducted by the first comparison member, and for setting a relatively long electric discharge pulse width suitable for forming a conductive film on a machined face of said workpiece in the case where the voltage between said electrodes is higher than the second reference voltage.

* * * * *